(12) United States Patent  
Schulz

(10) Patent No.: US 7,520,458 B2
(45) Date of Patent: Apr. 21, 2009

(54) GRANULATING DEVICE

(75) Inventor: Helmuth Schulz, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 11/885,607

(22) PCT Filed: May 16, 2006

(86) PCT No.: PCT/AT2006/000202

§ 371 (c)(1),
(2), (4) Date: Aug. 31, 2007

(87) PCT Pub. No.: WO2006/122340

PCT Pub. Date: Nov. 23, 2006

(65) Prior Publication Data

US 2008/0164352 A1    Jul. 10, 2008

(30) Foreign Application Priority Data

May 18, 2005  (AT)  ................................ A 849/2005

(51) Int. Cl.
*A01F 29/00* (2006.01)
*B02C 19/00* (2006.01)
*B03B 7/00* (2006.01)
(52) U.S. Cl. .................. 241/101.4; 241/278.1; 425/313
(58) Field of Classification Search .................. 241/277, 241/278.1, 101.4; 425/313, 311
See application file for complete search history.

(56) References Cited

U.S. PATENT DOCUMENTS 2,417,564 A * 3/1947 Newman .................. 241/273.2
3,035,621 A * 5/1962 Burcham .................... 241/277
5,223,279 A * 6/1993 Lambertus .................. 425/186
5,580,007 A * 12/1996 Caviezel et al. ........ 241/199.12

FOREIGN PATENT DOCUMENTS

| DE | 28 25 639 A1 | 12/1979 |
|---|---|---|
| DE | 195 15 473.8 A1 | 10/1996 |
| DE | 103 02 645 A1 | 7/2004 |
| SU | 1323401 A1 | 7/1987 |
| WO | WO 01/94088 A2 | 12/2001 |
| WO | WO 01/94088 A3 | 12/2001 |

* cited by examiner

*Primary Examiner*—Bena Miller
(74) *Attorney, Agent, or Firm*—Townsend and Townsend and Crew, LLP

(57) ABSTRACT

The invention relates to a device for granulation of an ejected material from at least one nozzle (7), in particular a thermoplastic plastic, with a perforated plate (2) comprising the nozzles (7). A blade head (10) supporting several blades (11) lies opposite the same, fixed to a shaft (9) which is rotatably driven by a motor (13). The motor (13) is suspended such as to be displaced relative to the housing (1) by means of a suspension (15), however the above is suspended in such a manner that displacement is only possible in the direction of the axis (8) of the shaft (9) and not in a radial direction. The suspension (15) comprises at least one membrane (14) which suspends the motor (13) on the granulator housing (1). The motor (13) can be adjusted relative to the perforated plate (2) by means of an adjuster device (27), such that the desired pressure of the blade on the perforated plate (2) is maintained. The excised granulate particles are drawn out of the housing (1) by means of coolant.

9 Claims, 2 Drawing Sheets

US 7,520,458 B2

GRANULATING DEVICE

CROSS-REFERENCES TO RELATED APPLICATIONS

This application is a U.S. National Phase Application of PCT/AT2006/000202, filed May 16, 2006, which claims benefit of Austrian application number A 849/2005, filed May 18, 2005, the disclosures of both of which are incorporated in their entirety by reference.

BACKGROUND OF THE INVENTION

The invention refers to a device for granulating of material pressed out from at least one nozzle, in particular of thermoplastic synthetic material, comprising a perforated plate for the nozzle(s), to which a knife head carrying at least one knife is oppositely positioned, which knife head is connected to a shaft driven for rotation by a motor and is displaceable in its axial direction, so that each knife passes the nozzle mouth in contact therewith and thereby chops the granules, which are carried off the granulating housing surrounding the perforated plate by a cooling medium introduced into the granulating housing, wherein the motor is movable relative to the granulating housing suspended by means of a suspension, which movability, however, is only in the axial direction of the shaft, and wherein an adjustment means for the axial adjustment of the motor relative to the perforated plate is provided.

Granulating apparatus in which the shaft can be adjusted in an axial direction are known in a plurality of embodiments. Frequently, the shaft of the knife head is bearingly supported within a sleeve which can be axially shifted. Thereby, always the desired pressure can be adjusted by which the knives are pressed towards the perforated plate. Mostly, the torque is transferred to the knife shaft by means of a denture clutch. If water is used as the cooling medium for the chopped granules, as is mostly the case, the knife shaft must be tightened with respect to the housing. Within this, there result difficulties caused by friction. The axial displacement of the knife shaft causes also a displacement of the running surface of the sealing ring by which sealing against water is effected, so that the conditions of friction are continuously changing. In a similar manner, also the friction values of the denture clutch change when shifting the knife shaft. Further, it must be considered that the sleeve forming the bearing runs within a sliding bearing which must be lubricated. Also within this there occur friction values which change with time, because the lubricant (mostly oil) becomes more or less gummy after some time, so that a relatively high momentum for breaking away occurs which is in conflict with the requirement that as a rule only an unimportant axial friction is desired. Further, a sleeve bearing requires a certain effort.

Since the knife shaft must always be bearingly supported within the motor, it has already been proposed to replace the sleeve bearing by the motor bearing. This constructional variant, however, does not avoid the initially described difficulties.

A granulating apparatus of the initially described kind is known from DE 10302645 A1 in which the relative to the granulating housing movable suspension of the motor and therefore of the motor shaft is constituted by a rod-guide means extending in the axial direction of the motor shaft. Also such a construction does not avoid the mentioned difficulties of uncontrollable friction conditions.

SUMMARY OF THE INVENTION

An object of the present invention is to avoid the mentioned difficulties and to improve an apparatus of the initially described kind so that the axial displacement of the knife shaft does not or only unimportantly influences a change of the friction conditions. The invention attains this object by the feature that at least one membrane is used for suspending the motor on the granulating housing. As within the lastly described known apparatus, also within the inventive granulating apparatus the motor is axially displaced with the knife shaft, so that no relative displacement between knife shaft and motor takes place and the difficulties are avoided which are caused by a relative displacement by knife shaft and motor. Since the suspension of the motor allows only an axial displacement thereof, and avoids radial displacements or allows them only in an unimportant amount, the radial positions of the knives with respect to the nozzle mouths and therefore the chopping actions of the knives are not impaired. When compared with the lastly described known construction, the inventive use of at least one membrane ensures the advantage that uncontrolled friction conditions, as they are unavoidable within a rod-guiding means, are safely avoided. Further, the inventive construction offers the advantage that the membranes can be used also for other purposes. Lastly, the inventive construction has also the advantage that the motor can be disposed within the real granulating housing, whereas within the lastly described known construction a separate housing provided with the rod-guiding means must be provided for the motor, which is sealed with respect to the cooling medium relative to the real granulating housing by means of a shaft sealing. Such a sealing action, within the spirit of the invention, is obtained by a membrane disposed at the front end of the motor facing the perforated plate, optionally also at the opposed front end of the motor. At the lastly mentioned front end, also springs, namely leaf springs, can be considered as an alternative for the membranes. For the front end of the motor facing the perforated plate, however, springs can be considered only then if air and not water is used as a cooling medium, unless provision is made for a separate sealing of the granulating housing and for a corresponding protection of the motor with respect to the cooling water. However, this would reduce the advantage obtained by the invention with respect to the effort. This reduce of constructional effort, when compared with the lastly described known construction, results from omitting the rod-guiding means and the separate housing. Further, the inventive construction replaces the comparatively complicated sealing radial and axial bearing of the knife shaft on the housing by a single radial bearing of the knife shaft at the membrane, which membrane at the same time can be used for sealingly closing the granulating housing with respect to the cooling medium.

Within the spirit of the invention, multi-layered membranes are particularly suitable, because they have a high stiffness in radial direction. Suitable materials for the membranes are in particular glass fiber-reinforced synthetic materials, for example co-polymers of polyoxymethylene, polybuteleneterephthalate, polytetrafluoroethylene and polypropylene ether. For polytetrafluoroethylene a glass fiber portion of about 25% is sufficient; for the other mentioned kinds of synthetic materials, glass fiber portions of about 30% are more favorable.

As a rule, the membranes used within the invention are sufficient also for taking up the torque effected by the shaft. If desired, an additional support can be given by a stop.

Further features and advantages of the invention result from the description of an embodiment, which is schematically shown in the drawing in two different working positions.

DESCRIPTION OF THE PREFERRED EMBODIMENTS

Figures 3, 4:
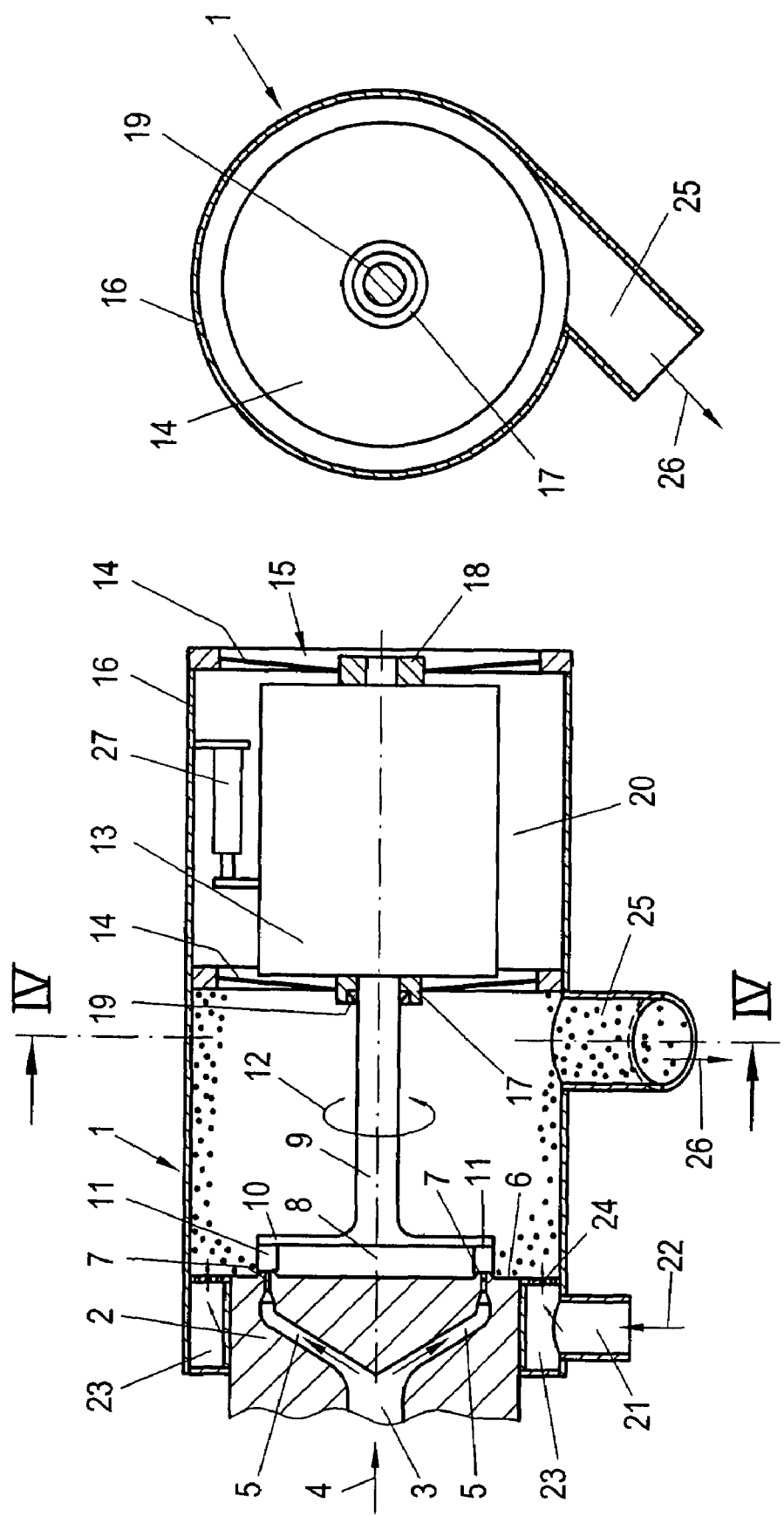
FIG. 3 shows the apparatus similar to FIG. 1 in an operative condition.
FIG. 4 is a section along line IV-IV of FIG. 3.

The apparatus has a cylindrical granulating housing 1 tightly closed at its one front end by a perforated plate 2. In the perforated plate a supply conduit 3 for the plasticized material to be granulated, in particular thermoplastic synthetic plastics material, is provided, which material flows in the direction of the arrow 4 from the supply conduit 3 into a plurality of distribution conduits 5 which lead to nozzles 7 provided at the front surface 6 of the perforated plate 7, which nozzles are disposed along a circle and in equal distances from each other around the central longitudinal axis 8 of the granulating housing 1. This axis 8 forms also the rotational axis of a shaft 9 which at its end facing the perforated plate 2 carries a knife head 10 which is provided with a plurality of knives 11 which slide over the mouths of the nozzles 7 when rotating the shaft 9 in direction of the arrow 12 (FIG. 3) and thereby chop the synthetic mass pressed out of the nozzles 7 into granulate particles. The shaft 9 is rotated by a motor 13 which at both its front ends is suspended at the cylindrical wall 16 of the granulating housing 1 by means of a suspension 15 formed by two membranes 14 so that the motor 13 and therefore the shaft 9 bearingly supported within it can be displaced in the direction of the axis 8, but not, or not substantially, in a radial direction. The most favorable suspension results if the suspension is fixed to the motor at two positions which—when measured in the direction of the axis 8—are spaced apart from each other as much as possible. In a simple manner, this can be made by positioning the two membranes 14 at both front ends of the motor 13. The two membranes 14 are clamped at their outer periphery to the wall 16 and at their central region to flanges 17, 18 connected to the motor housing, which flanges are arranged at the two front ends of the motor housing. The flange 17 facing the perforated plate 2 serves simultaneously for taking up a shaft sealing 9 which is tightened with respect to the cooling water introduced into the granulating housing 1. Also tight is the fastening of the outer edge of the perforated plate-side membrane 14 to the granulating housing 1. The space 20 disposed between the two membranes 14 and taking up the motor 13, therefore, is sealed with respect to the cooling medium, in particular cooling-water, introduced in to the granulating housing 1. This cooling water is supplied through a line 21 in the direction of the arrow 22 (FIG. 3) and streams into an annular space 23 surrounding the perforated plate 2, from which it enters the interior of the granulating housing 1 through a plurality of openings 24, flows along the inner side of the wall 16 in the form of a water film and thereby cools the granulate particles immediately after they are cut by the knives 11, so that it is avoided that these particles agglomerate to each other. The cooled granulate particles are carried off the granulating housing 1 together with the cooling water through a discharge line 25 in the direction of the arrow 26.

In order to ensure that the knives 11 slide always with the desired pressure over the mouths of the nozzles 7, the shaft 9 together with the motor 13 driving it can be adjusted in the direction of the axis 8. For this, an adjustment means 27 is provided which can be formed by an actuator of any desired kind, for example by means of screw threads, a magnet, a motor operator, and the like. The adjustment means is connected to the granulating housing 1 and is in contact with the housing of the motor 13. Within this, it is of advantage that there is no influence by friction. The bending behavior of the two membranes can be determined or calculated and changes in no manner, because it remains constant with time. A further advantage is given by the reduction of the construction costs, when compared with known constructions, and further by the fact that the shaft sealing 19 is not shifted relative to the shaft 9, so that the friction conditions occurring there remain substantially more constant with time. Further, the necessary transfer of the torque by means of an axially displaceable denture coupling of known constructions is dropped so that the torque occurring at the shaft and necessary for chopping the granulate can be unadulteratedly used as a measuring unit. Means suitable for this are known.

A further advantage of the inventive construction is that a positive wear behavior of the knives 11 is obtained, because vibrations of the members carrying the knives 11 are avoided.

Materials suitable for the membranes are known, for example foils of metal or synthetic material. Particularly suitable are membranes which have a multilayer structure, which results in a high radial stiffness and in a better axial flexibility.

Figures 1, 2:
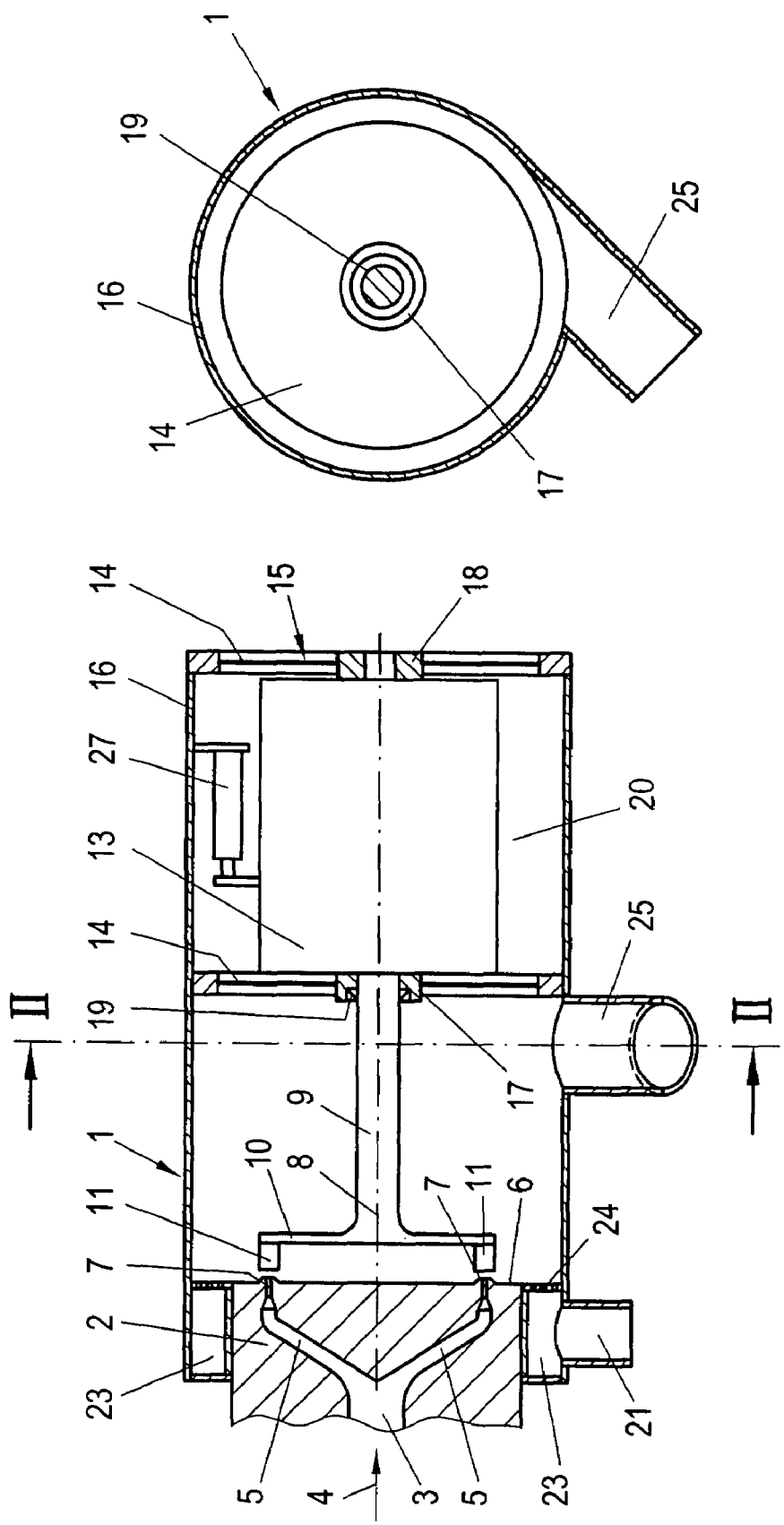
FIG. 1 shows the apparatus in an axial section in the inoperative position.
FIG. 2 is a section along line II-II of FIG. 1'.

In the non-operating position of the apparatus, shown in FIG. 1, the two membranes 14 are relaxed, therefore, each of them extends in a plane. In the operating position shown in FIG. 3, however, the motor 13 and therefore the granulating knives 11 are pressed to the perforated plate 2 via the shaft 9 by the adjustment means 27, and this with the respective pressure, which can be performed in a simple manner by a corresponding control of the adjustment means 27, for example by the already mentioned torque sensing (power consumption of the motor 13).

As can be seen, the invention is applicable as well to underwater-granulating apparatus as to granulating apparatus in which the granules are cut in a hot condition. The granulating housing 1 can be filled with water, or as shown in the drawing, the granulate particles can be carried off by a water film. Of course, also air, in particular cooled air, can be used as a cooling or conveying medium instead of water. The use of leaf springs for suspending the motor instead of a membrane at the back wall of the granulating housing 1 is possible. This has the advantage that cooling of the motor 13 is improved.

The invention claimed is:

1. Apparatus for granulating of material pressed out from at least one nozzle, in particular of thermoplastic synthetic material, comprising a perforated plate having the nozzle(s), to which a knife head carrying at least one knife is oppositely disposed which is connected to a shaft driven for rotation by a motor and being adjustable in an axial direction, so that each knife runs in contact to the nozzle mouth and thereby cuts off the granulate particles which are carried off the granulating housing surrounding the perforated plate by a cooling medium introduced into the granulating housing, wherein the motor is suspended by means of a suspension movable relative to the granulating housing, which movability, however, is only given in the axial direction of the shaft, and wherein an adjustment means for axial displacement of the motor with respect to the perforated plate is provided, at least one membrane being used for suspending the motor on the granulating housing.

2. Apparatus according to claim 1, wherein a membrane sealingly closes the granulating housing with respect to the cooling medium.

3. Apparatus according to claim 1, wherein a membrane sealingly closes the motor with respect to the cooling medium within the granulating housing.

4. Apparatus according to claim 1, wherein a membrane (14) is provided at least one of the front end of the motor facing the perforated plate and the oppositely located front end of the motor.

5. Apparatus according to claim 4, wherein the membrane is connected to a flange of the motor housing provided with a shaft sealing of the motor.

6. Apparatus according to claim 1, wherein the adjustment means for the axial displacement of the motor with respect to the perforated plate is connected to the granulating housing and contacts the motor in the space between two membranes.

7. Apparatus according to claim 1, wherein the membrane has a layered structure.

8. Apparatus according to claim 1, wherein the membrane comprises synthetic material reinforced by insertions.

9. Apparatus according to claim 8 wherein the insertions comprise a glass-fiber reinforced synthetic material.

* * * * *